US008289828B2

(12) United States Patent
Mori (10) Patent No.: US 8,289,828 B2
(45) Date of Patent: Oct. 16, 2012

(54) OPTICAL DATA RECORDING/REPRODUCTION APPARATUS

(75) Inventor: Hiromitsu Mori, Fujisawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/051,506

(22) Filed: Mar. 18, 2011

(65) Prior Publication Data

US 2012/0030694 A1  Feb. 2, 2012

(30) Foreign Application Priority Data

Jul. 29, 2010 (JP) ................................. 2010-169977

(51) Int. Cl.
*G11B 7/00* (2006.01)
(52) U.S. Cl. ............... 369/53.19; 369/44.23; 369/44.32; 369/112.01; 720/681
(58) Field of Classification Search ............... 369/44.19, 369/44.21, 44.23, 44.32, 53.19, 44.25, 112.01, 369/112.23; 720/681
See application file for complete search history.

(56) References Cited

U.S. PATENT DOCUMENTS

| 6,304,526 | B1 * | 10/2001 | Nagashima et al. | ....... 369/44.23 |
| 6,845,078 | B2 * | 1/2005 | Furuhata et al. | ......... 369/112.23 |
| 2002/0181367 | A1 * | 12/2002 | Ogasawara | ................ 369/53.19 |
| 2004/0190400 | A1 * | 9/2004 | Wada et al. | ................ 369/44.11 |
| 2006/0018214 | A1 * | 1/2006 | Fujii et al. | .................. 369/44.37 |
| 2006/0193217 | A1 | 8/2006 | Mori et al. | |
| 2006/0198254 | A1 * | 9/2006 | Hirai et al. | ................. 369/44.13 |
| 2008/0134226 | A1 * | 6/2008 | Shimizu | ........................ 720/660 |
| 2008/0198730 | A1 | 8/2008 | Mori et al. | |
| 2009/0080298 | A1 * | 3/2009 | Yamasaki et al. | .......... 369/44.23 |
| 2010/0149955 | A1 * | 6/2010 | Kaneda | .................... 369/112.23 |
| 2010/0271927 | A1 * | 10/2010 | Furuichi | ................. 369/112.24 |

FOREIGN PATENT DOCUMENTS

| JP | 2005-122783 | 5/2005 |
| JP | 2006-236513 | 9/2006 |
| JP | 2008-204517 | 9/2008 |
| JP | 2010-073238 | 4/2010 |
| JP | 2010-140566 | 6/2010 |
| JP | 2010-211842 | 9/2010 |

* cited by examiner

*Primary Examiner* — Thomas Alunkal
(74) *Attorney, Agent, or Firm* — McDermott Will & Emery LLP (57) ABSTRACT

The relation between the cover layer thickness of a data recording surface and ratio α of SCO to SCD is previously calculated and stored in a storage unit, where SCD denotes coma aberration which occurs when the data recording medium is tilted by unit angle and SCO denotes coma aberration which occurs when the objective lens is tilted by unit angle. When α1 denotes ratio α for a data recording surface corresponding to the smallest cover layer thickness, tilting angle θ1 of the objective lens is determined based on the α1 and a tilt adjustment of the objective lens is made. Also, when α2 denotes ratio α for a target data recording surface, tilting angle θ2 of the objective lens is estimated based on the ratio of α2 to α1 and a tilt correction of the objective lens is made.

6 Claims, 11 Drawing Sheets

· RATIO $\alpha$ = SCO/SCD

SCO: COMA ABERRATION WHICH OCCURS WHEN OBJECTIVE LENS IS TILTED BY UNIT ANGLE

SCD: COMA ABERRATION WHICH OCCURS WHEN DATA RECORDING MEDIUM IS TILTED BY UNIT ANGLE

· APPROXIMATION OF CURVE 801  $\alpha = A \times t^2 + B \times t + C$

TILT ADJUSTMENT FOR LAYER L3

$\theta1 = \alpha1 \times \theta D$ $\theta1$: TILTING ANGLE OF OBJECTIVE LENS FOR LAYER L3

$\theta D$: TILT OF DATA RECORDING SURFACE

FIG. 9B

TILT CORRECTION FOR TARGET LAYER 901

$\theta2 = K \times \theta D$

COEFFICIENT $K = \alpha2 / \alpha1$ $\theta2$: TILTING ANGLE OF OBJECTIVE LENS FOR TARGET DATA RECORDING SURFACE 901

$\theta D$: TILT OF DATA RECORDING SURFACE

FIG. 10

OPTICAL DATA RECORDING/REPRODUCTION APPARATUS

CLAIM OF PRIORITY

The present application claims priority from Japanese patent application serial No. 2010-169977, filed on Jul. 29, 2010, the content of which is hereby incorporated by reference into this application.

BACKGROUND OF THE INVENTION (1) Field of the Invention

The present invention relates to an optical data recording/reproduction apparatus which incorporates an optical pickup for recording or reproducing a data signal on an optical data recording medium.

(2) Description of the Related Art

Generally, when an optical data recording medium is tilted, coma aberration occurs and the focused light spot on the data recording surface of the data recording medium deteriorates, so it becomes impossible to record and/or reproduce data signals normally. Such coma aberration is proportional to the cube of the objective lens numerical aperture (NA) and proportional to the reciprocal of the laser wavelength. For BDs (Blu-ray Disc) in particular, the objective lens NA is 0.85 which is larger than that for DVDs, and the laser wavelength is as small as 405 nm. Therefore, for BDs, it is important to reduce coma aberration.

As an example of a solution to this problem, JP-A No. 2010-140566 discloses a technique which reduces coma aberration properly when the ambient temperature changes. It describes that for the objective lens, (1) a lens tilt correction is made if the lens tilt sensitivity is a prescribed value or more, and (2) a lens tilt correction is not made if the lens tilt sensitivity is less than the prescribed value.

SUMMARY OF THE INVENTION

In recent years, the tendency toward multi-channel and high-definition broadcast services has been growing in digital broadcasting and the use of video information devices capable of dealing with high-definition signals has been spreading. This means that the volumes of data which individual users handle are continuously increasing. With this background, multi-layer BD standards (BDXL) for approximately 100 GB three-layer discs and approximately 128 GB four-layer discs have been recently set up in order to realize BDs whose capacities are larger than those of existing BDs (approximately 25 GB in the case of single-layer discs and approximately 50 GB in the case of dual-layer discs). According to the technique described in JP-A No. 2010-140566, a lens tilt correction is made in response to an ambient temperature change but a lens tilt adjustment or correction for the multi-layer BDs as mentioned above is not considered nor disclosed.

An object of the present invention is to provide an optical data recording/reproduction apparatus which can make tilt adjustments and tilt corrections of the objective lens in a manner suitable for multi-layer BDs.

The above object can be realized by the constitution and means described in the claims of the present invention as an example.

According to the present invention, coma aberration can be properly corrected on the data rerecording surface of a multi-layer BD to assure the light spot quality on the data recording surface, so it is possible to realize an optical data recording/reproduction apparatus which provides high recording and reproduction performances.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Figure 1:
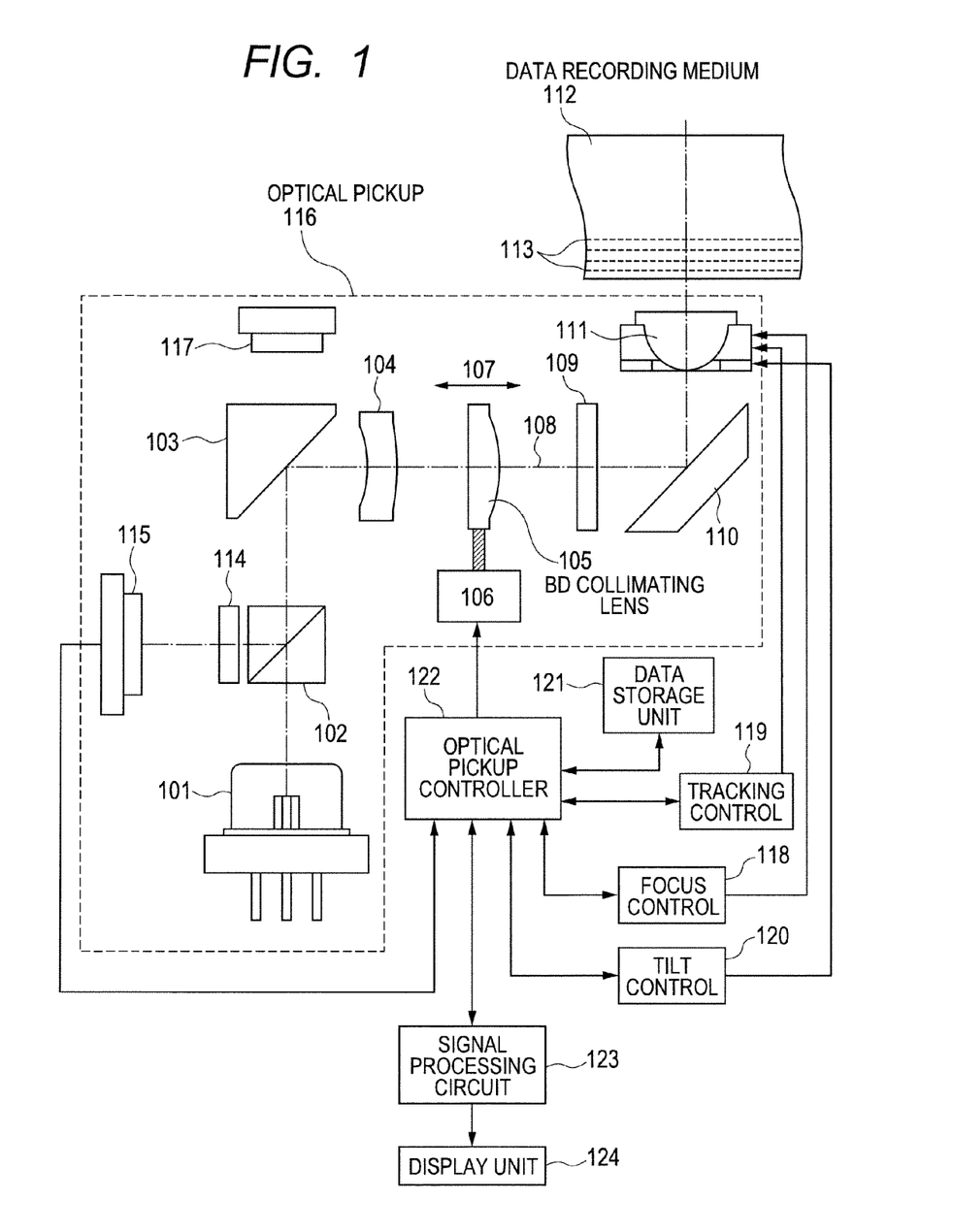
FIG. 1 shows an optical data recording/reproduction apparatus for multi-layer BDs according to an embodiment of the invention.

FIG. 1 shows an optical data recording/reproduction apparatus for multi-layer BDs according to an embodiment of the invention, in which the area enclosed by dotted line 116 represents an optical pickup in this embodiment. A linearly polarized divergent light beam in the 405 nm wavelength band is emitted from a BD laser light source 101 and converted into an approximately parallel light beam by a BD collimating lens 105 through a polarized beam splitter 102, reflective mirror 103, and BD auxiliary lens 104. The BD collimating lens 105 moves in the direction of an optical axis 108 as indicated by arrow 107 by a spherical aberration correction driving unit 106 which uses, for example, a stepping motor. The light beam emitted from the BD collimating lens 105 is converted into circularly polarized light by a quarter-wave plate 109 and after the light path is bent perpendicularly by a BD standing mirror 110, the light is focused by a BD objective lens 111 with a numerical aperture of 0.85 and cast on the data recording surface 113 of the data recording medium 112.

The light beam reflected by the data recording surface 113 is passed through the BD objective lens 111 and the BD standing mirror 110 and converted into linearly polarized light by the quarter-wave plate 109, then passed through the BD collimating lens 105, the BD auxiliary lens 104 and the reflective mirror 103 and reflected by the reflection surface of the polarized light beam splitter 102 before entering a multi-fractionated diffraction element 114. Then, the light beam is divided by the multi-fractionated diffraction element 114 into a plurality of light beams which then reach a BD light detector 115. In this embodiment, as a servo signal detection method, for example, the knife-edge method is used for focus error signals and the push-pull method is used for tracking error signals to control the position of the focused light spot on the data recording surface 113 of the data recording medium 112. Since the knife edge method and the push-pull method are known techniques, their descriptions are omitted here.

The light beam from the BD laser light source 101 which has passed above the beam splitter 102 and the reflective mirror 103 is received by a front monitor 117 and a detection signal from the monitor is fed back to a BD laser drive control circuit (not shown) to control the intensity of light from the BD laser light source 101.

In the optical pickup in this embodiment, where SCD denotes coma aberration which occurs when the data recording medium 112 is tilted by unit angle and SCO denotes coma aberration which occurs when the BD objective lens 111 is tilted by unit angle, the relation between the cover layer thickness of the data recording surface 113 and the ratio α of SCO to SCD (SCO/SCD) is previously calculated and the calculated relation data is stored in a pickup data storage unit 121. Also, the relation between the collimating lens position data or stepping motor drive pulse number and the ratio α may be previously calculated and the calculated relation data may be stored in the pickup data storage unit 121.

The pickup data storage unit 121 is connected with a pickup controller 122 and the pickup controller 122 can call the ratio α data from the pickup data storage unit 121 for a tilt adjustment and a tilt correction which will be stated later.

The pickup controller 122 is connected with a signal processing circuit 123, a focus control circuit 118, a tracking control circuit 119, and a tilt control circuit 120. The focus control circuit 118, tracking control circuit 119, and tilt control circuit 120 are connected with an actuator (not shown) which holds and drives the BD objective lens 111. The BD light detector 115 emits focus error signals, tracking error signals, data reproduction signals, and tilt detection signals and these signals are transmitted to the signal processing circuit 123. The signal processing circuit 123 processes the signals and transmits optimum signals through the optical pickup controller 122 to the focus control circuit 118, tracking control circuit 119, and tilt control circuit 120 and drives the actuator (not shown) to control the position of the light spot on the data recording surface 113 of the data recording medium 112. The signal processing circuit 123 is connected with a display unit 124 so that when the user controls the apparatus, a user instruction is sent from the user input device (not shown) to the signal processing circuit 123 and the processing result is displayed on the display unit 124.

Figure 2A:
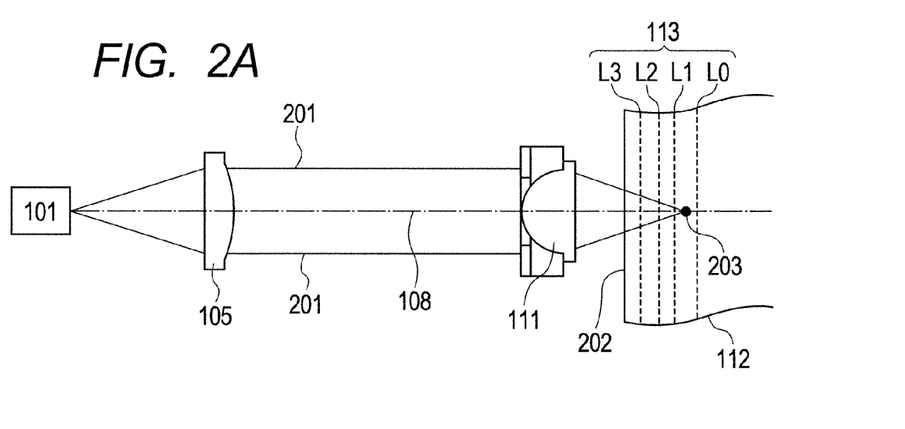
FIG. 2A illustrates light entering a BD objective lens and impinging on a data recording surface in a spherical aberration correction process (when a BD collimating lens 105 is in a standard position)
Figure 2B:
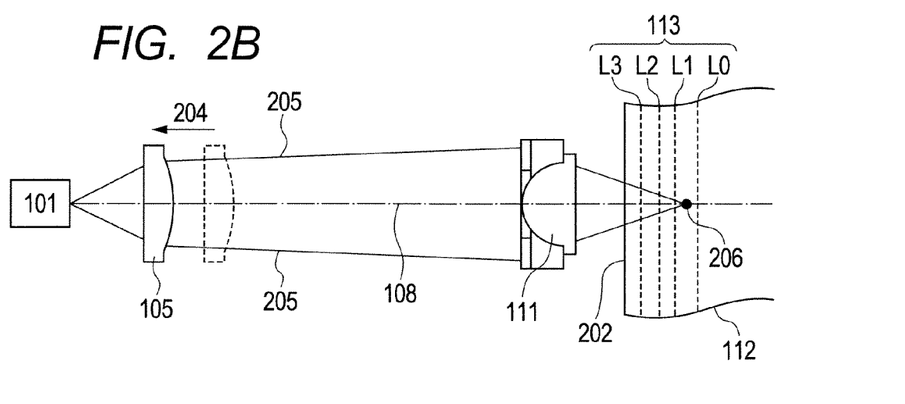
FIG. 2B illustrates light entering the BD objective lens and impinging on a data recording surface in a spherical aberration correction process (when the BD collimating lens 105 is moved away from the BD objective lens 111)
Figure 2C:
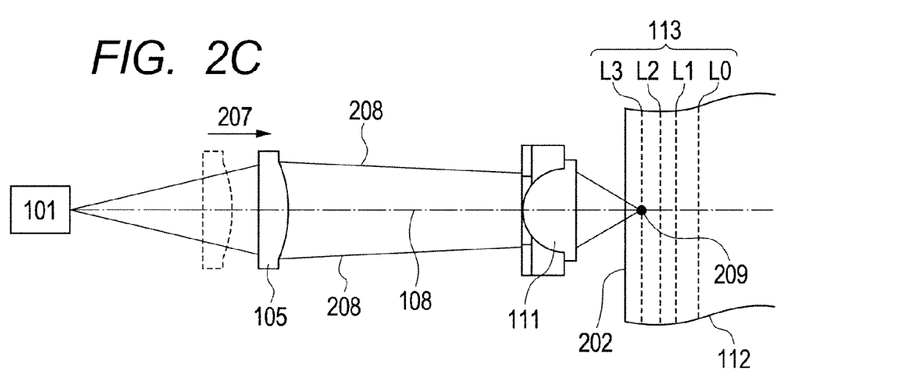
FIG. 2C illustrates light entering the BD objective lens and impinging on a data recording surface in a spherical aberration correction process (when the BD collimating lens 105 is moved toward the BD objective lens 111)

FIGS. 2A to 2C show the light entering the BD objective lens 111 and impinging on the data recording surface 113 of the data recording medium 112 when a spherical aberration correction is made by the spherical aberration correction driving unit 106. In the following explanation of this embodiment, it is assumed that the recording medium is a four-layer data recording medium which has four data recording layers L3, L2, L1, and L0 from the surface 202 in order.

FIG. 2A illustrates a case that the BD collimating lens 105 is in a standard position, in which parallel light 201 enters the BD objective lens 111. Then, the light is focused, for example, on a spot 203 which is 87.5 μm thick (deep) from the surface 202 (between L0 and L1).

FIG. 2B illustrates a case that the BD collimating lens 105 is moved in the direction indicated by arrow 204, namely away from the BD objective lens 111 along the optical axis 108, in which the light 201 entering the BD objective lens 111 is converted from the parallel light 201 into divergent light 205 and focused, for example, on a spot 206, thicker (deeper) than the spot with a thickness of 87.5 μm.

FIG. 2C illustrates a case that the BD collimating lens 105 is moved in the direction indicated by arrow 207, namely towards the BD objective lens 111 along the optical axis 108, in which the light entering the BD objective lens 111 is converted from the parallel light 201 into convergent light 208 and focused, for example, on a spot 209, less thick (less deep) than the spot with a thickness of 87.5 μm. Here, by varying the amount of movement of the BD collimating lens 105, the light can be focused on a layer other than the layer L3, namely the layer L1 or L2.

Figure 3A:
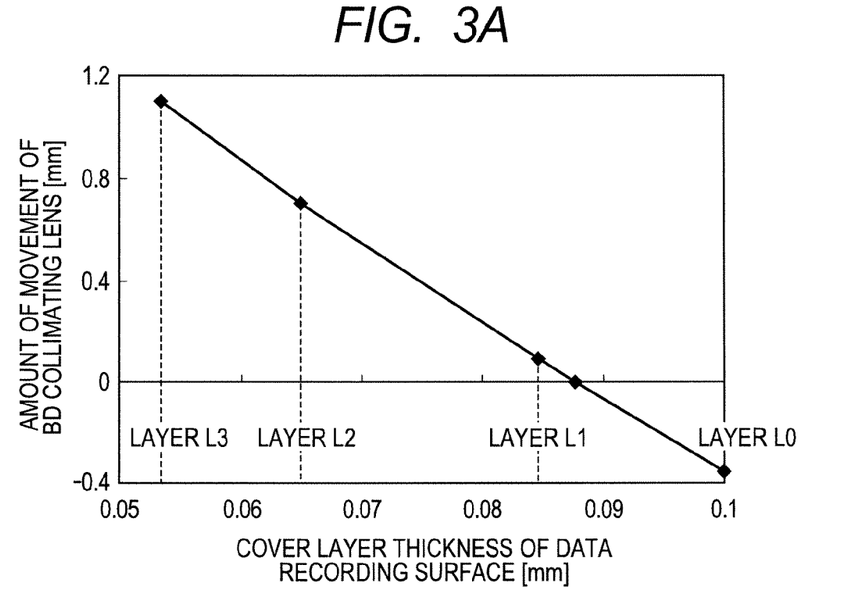
FIG. 3A is a graph showing the relation between the cover layer thickness of the data recording surface and the amount of movement of the BD collimating lens.

FIG. 3A shows an example of a calculation result of the relation between the cover layer thickness of the data recording surface L0, L1, L2, or L3 (depth from the surface 202) and the required amount of movement of the BD collimating lens 105 when a spherical aberration correction is made as explained above with reference to FIGS. 2A to 2C. Here it is assumed that the cover layer thicknesses (depths) of the data recording surfaces (layers) L0, L1, L2, and L3 are 0.1 mm, 0.0845 mm, 0.065 mm, and 0.054 mm, respectively. Regarding the amount of movement of the BD collimating lens 105, a positive value (+) corresponds to the direction indicated by the arrow 207 in FIG. 2C and a negative value (−) corresponds to the direction indicated by the arrow 204 in FIG. 2B. 0 as the amount of movement corresponds to the case shown in FIG. 2A, in which the cover layer thickness of the data recording surface is 0.0875 mm (design standard cover thickness for the BD objective lens 111). The relation between the cover layer thickness of the data recording surface and the required amount of movement of the BD collimating lens 105 is linear and when the BD collimating lens 105 is moved 1 mm, a spherical aberration equivalent to a cover layer thickness of 0.032 mm can be corrected.

Figure 3B:
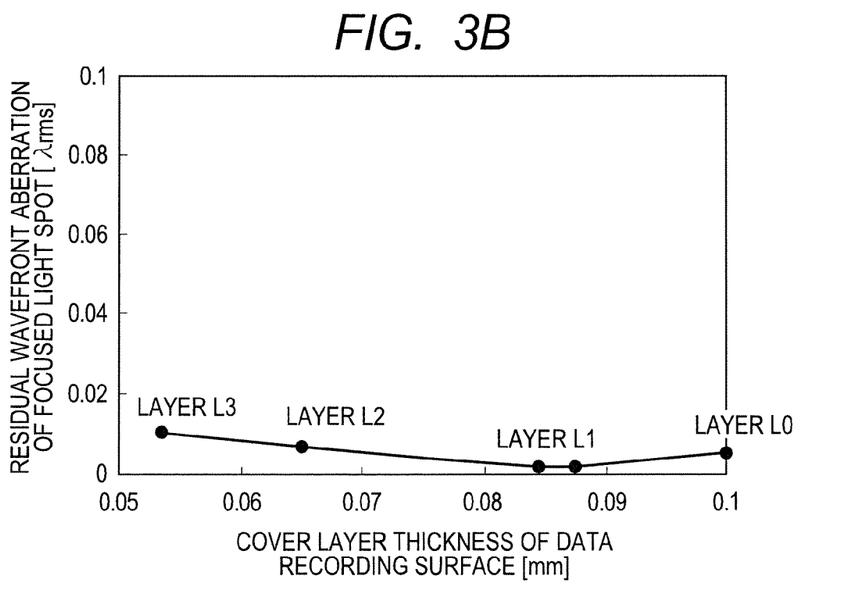
FIG. 3B is a graph showing the relation between the cover layer thickness of the data recording surface and the residual wavefront aberration of a focused light spot.

FIG. 3B is a graph showing an example of a calculation result of the relation between the cover layer thickness of the data recording surface and the residual wavefront aberration of the focused light spot on the data recording surfaces L0, L1, L2, and L3 when a spherical aberration correction is made. The graph demonstrates that the residual wavefront aberration is not larger than 0.01 λrms.

Figure 4A:
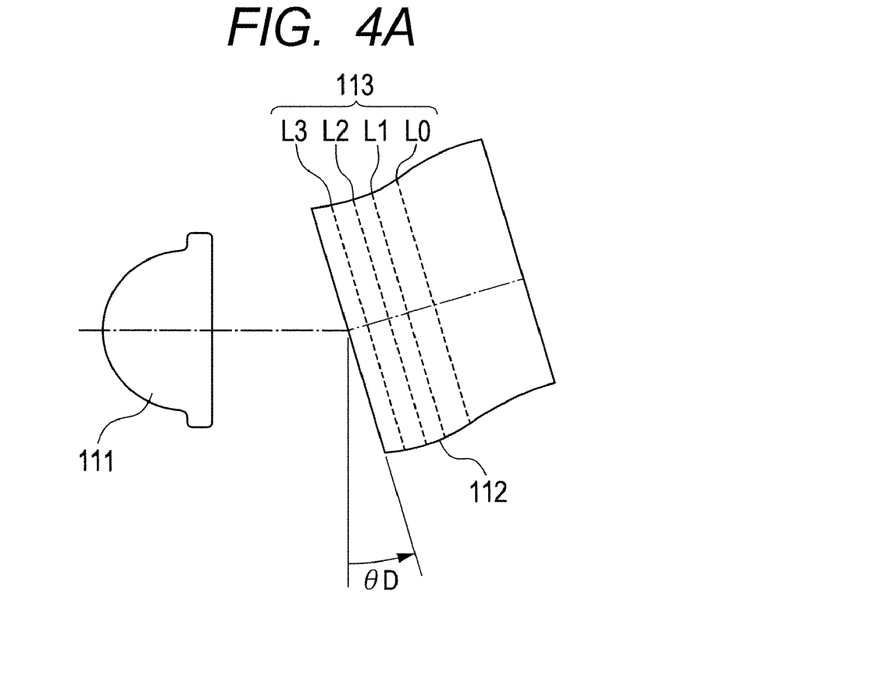
FIG. 4A illustrates the data recording surface tilted by angle θD with respect to the objective lens.
Figure 4B:
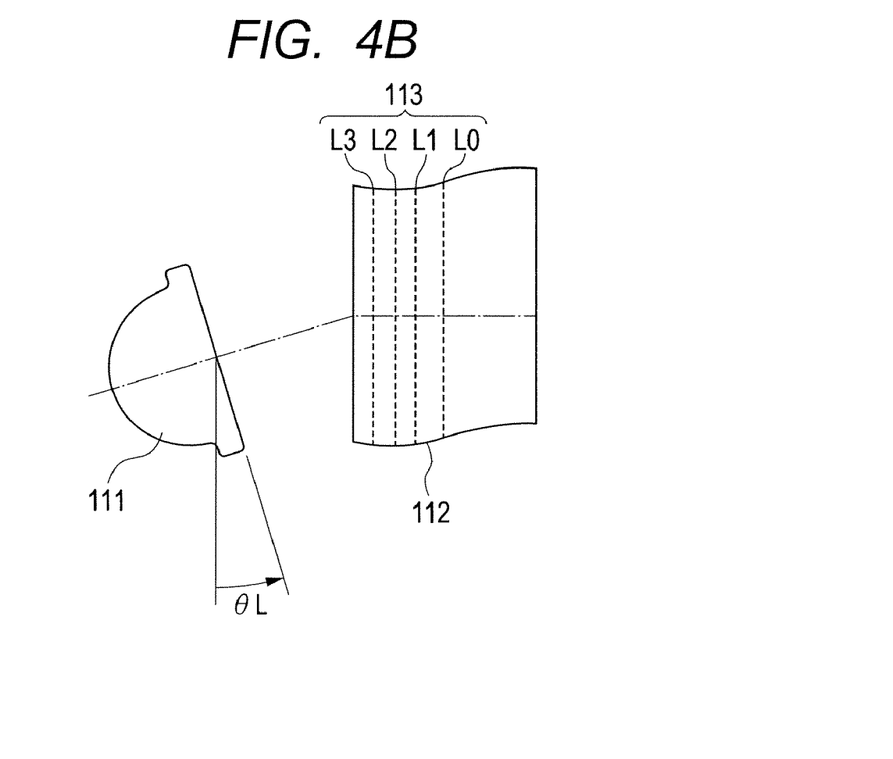
FIG. 4B illustrates the objective lens tilted by angle θL with respect to the data recording surface.

FIG. 4A illustrates the data recording surface 113 of the data recording medium 112 tilted by angle θD with respect to the objective lens 111 and FIG. 4B illustrates the objective lens 111 tilted by angle θL with respect to the data recording surface 113 of the data recording medium 112.

FIGS. 5A and 5B and FIGS. 6A to 6C each show an example of a calculation result of three-dimensional coma aberration which occurs at the focused light spot on the data recording surface 113 of the data recording medium 112.

Figure 5A:
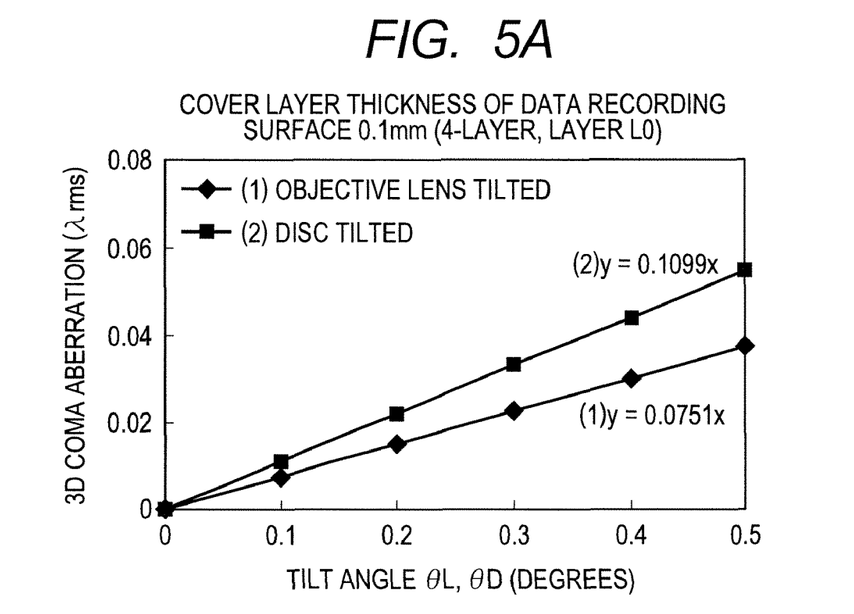
FIG. 5A is a graph showing the relation between tilt angle θL, θD and three-dimensional coma aberration when the cover layer thickness of the data recording surface is 0.1 mm.
Figure 5B:
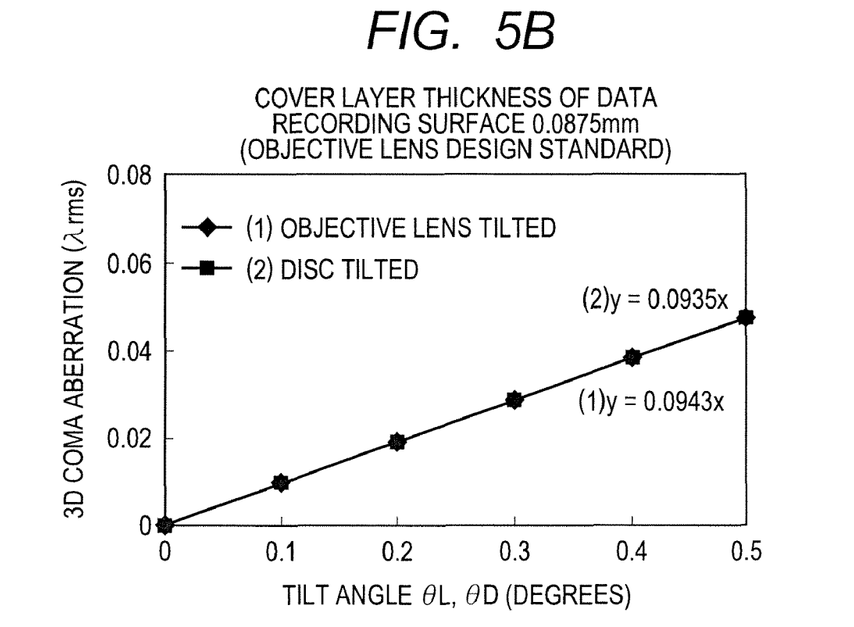
FIG. 5B is a graph showing the relation between tilt angle θL, θD and three-dimensional coma aberration when the cover layer thickness of the data recording surface is 0.0875 mm.

FIG. 5A shows an example of a calculation result of three-dimensional coma aberration in the layer L0 (0.1 mm) among the four data recording surfaces (layers) L3, L2, L1, and L0 of the four-layer data recording medium (1) with the BD objective lens 111 tilted by angle θL and (2) with the data recording medium 112 (disc) tilted by angle θD. FIG. 5B shows an example of a calculation result of three-dimensional coma aberration which occurs at a thickness of 0.0875 mm as the design standard cover layer thickness (1) with the BD objective lens 111 tilted by angle θL and with the data recording medium 112 (disc) tilted by angle θD.

Figure 6A:
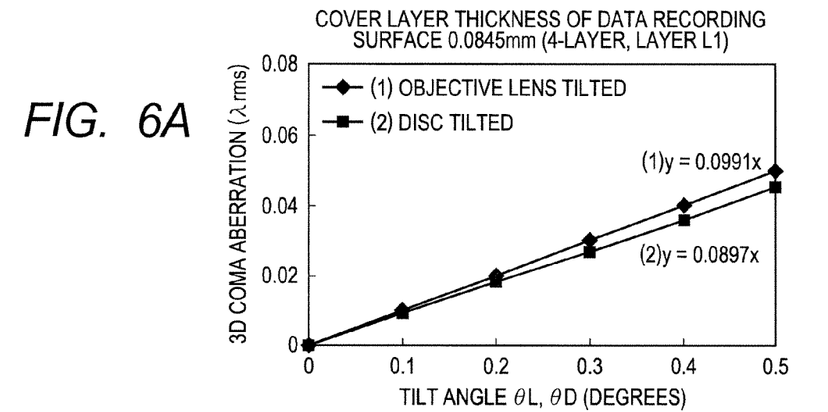
FIG. 6A is a graph showing the relation between tilt angle θL, θD and three-dimensional coma aberration when the cover layer thickness of the data recording surface is 0.0845 mm.
Figure 6B:
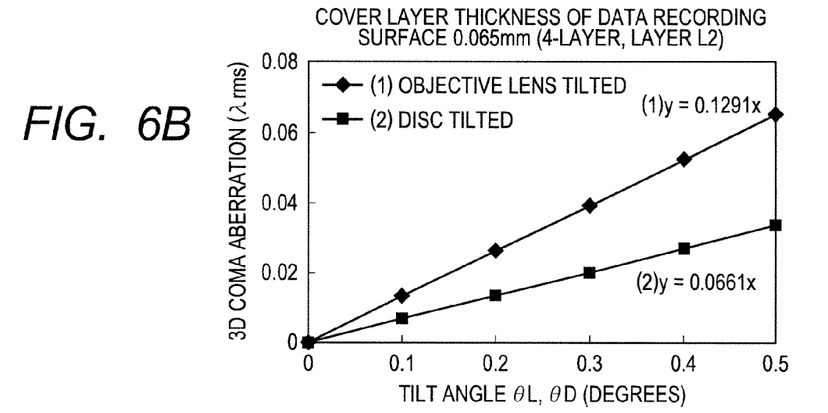
FIG. 6B is a graph showing the relation between tilt angle θL, θD and three-dimensional coma aberration when the cover layer thickness of the data recording surface is 0.065 mm.
Figure 6C:
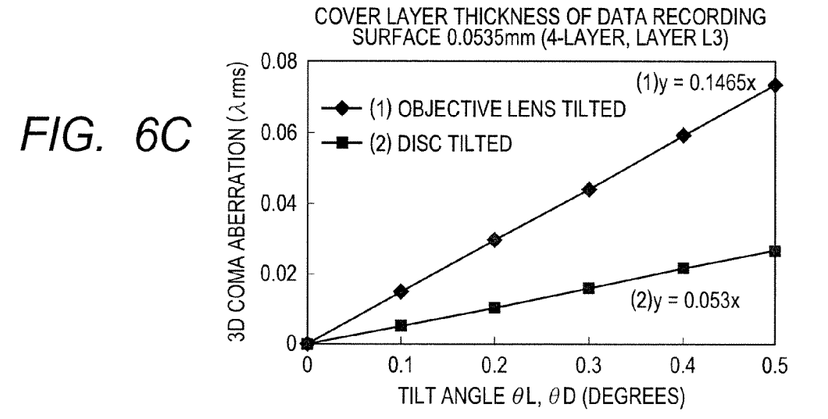
FIG. 6C is a graph showing the relation between tilt angle θL, θD and three-dimensional coma aberration when the cover layer thickness of the data recording surface is 0.0535 mm.

FIG. 6A shows an example of a calculation result of three-dimensional coma aberration in the layer L1 (0.0845 mm) (1) with the BD objective lens 111 tilted by angle θL and (2) with the data recording medium 112 (disc) tilted by angle θD. FIG. 6B shows an example of a calculation result of three-dimensional coma aberration in the layer L2 (0.065 mm) (1) with the BD objective lens 111 tilted by angle θL and (2) with the data recording medium 112 (disc) tilted by angle θD. FIG. 6C shows an example of a calculation result of three-dimensional coma aberration in the layer L3 (0.0535 mm) (1) with the BD objective lens 111 tilted by angle θL and (2) with the data recording medium 112 (disc) tilted by angle θD.

The calculation results in FIGS. 5A and 5B and FIGS. 6A to 6C suggest as follows. In the layer L0 (0.1 mm), the gradient of three-dimensional coma aberration versus the tilt angle of (2) the data recording medium 112 (disc) is larger than the gradient of three dimensional aberration versus the tilt angle of (1) the BD objective lens 111. In the design standard cover layer thickness for the BD objective lens 111 (0.0875 mm), the gradient of three-dimensional coma aberration versus the tilt angle of (1) the BD objective lens is almost equal to the gradient of three dimensional aberration versus the tilt angle of (2) the data recording medium 112 (disc). Furthermore, in the layer L1 (0.0845 mm), layer L2 (0.065 mm), and layer L3 (0.0535 mm), the gradient of three-dimensional coma aberration versus the tilt angle of (1) the BD objective lens 111 is larger than the gradient of three dimensional aberration versus the tilt angle of (2) the data recording medium 112 (disc). Particularly, the difference in the gradient of three-dimensional coma aberration versus the tilt angle between (1) the BD objective lens 111 and (2) the data recording medium 112 (disc) is the largest in the layer L3 (0.0535 mm).

Figure 7:
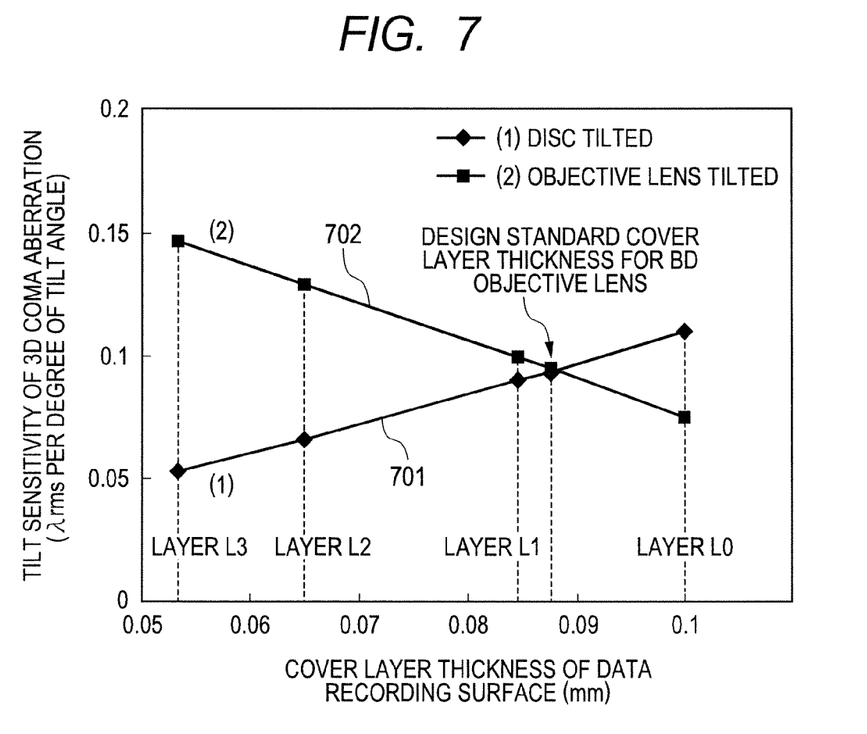
FIG. 7 is a graph showing the relation between the cover layer thickness of the data recording surface and the tilt sensitivity of three-dimensional coma aberration.

Based on the calculation results in FIGS. 5A and 5B and FIGS. 6A to 6C, as for (1) the BD objective lens 111 and (2) the data recording medium 112 (disc), FIG. 7 graphically shows the relation between the cover layer thickness of the data recording surface and the tilt sensitivity of three-dimensional coma aberration, expressed as three-dimensional coma aberration per degree of tilt angle (λrms per degree of tilt angle). In the graph, 701 represents the characteristics of the data recording medium 112 and 702 represents the characteristics of the BD objective lens 111. 701 indicates that as the cover layer thickness of the data recording surface increases, the sensitivity linearly increases and 702 indicates that as the cover layer thickness of the data recording surface increases, the sensitivity linearly decreases. The cover layer thickness at which 701 and 702 cross each other or are equal in the tilt sensitivity of three-dimensional coma aberration is 0.0875 mm, which is equal to the design standard cover layer thickness for the BD objective lens 111.

Figure 8:
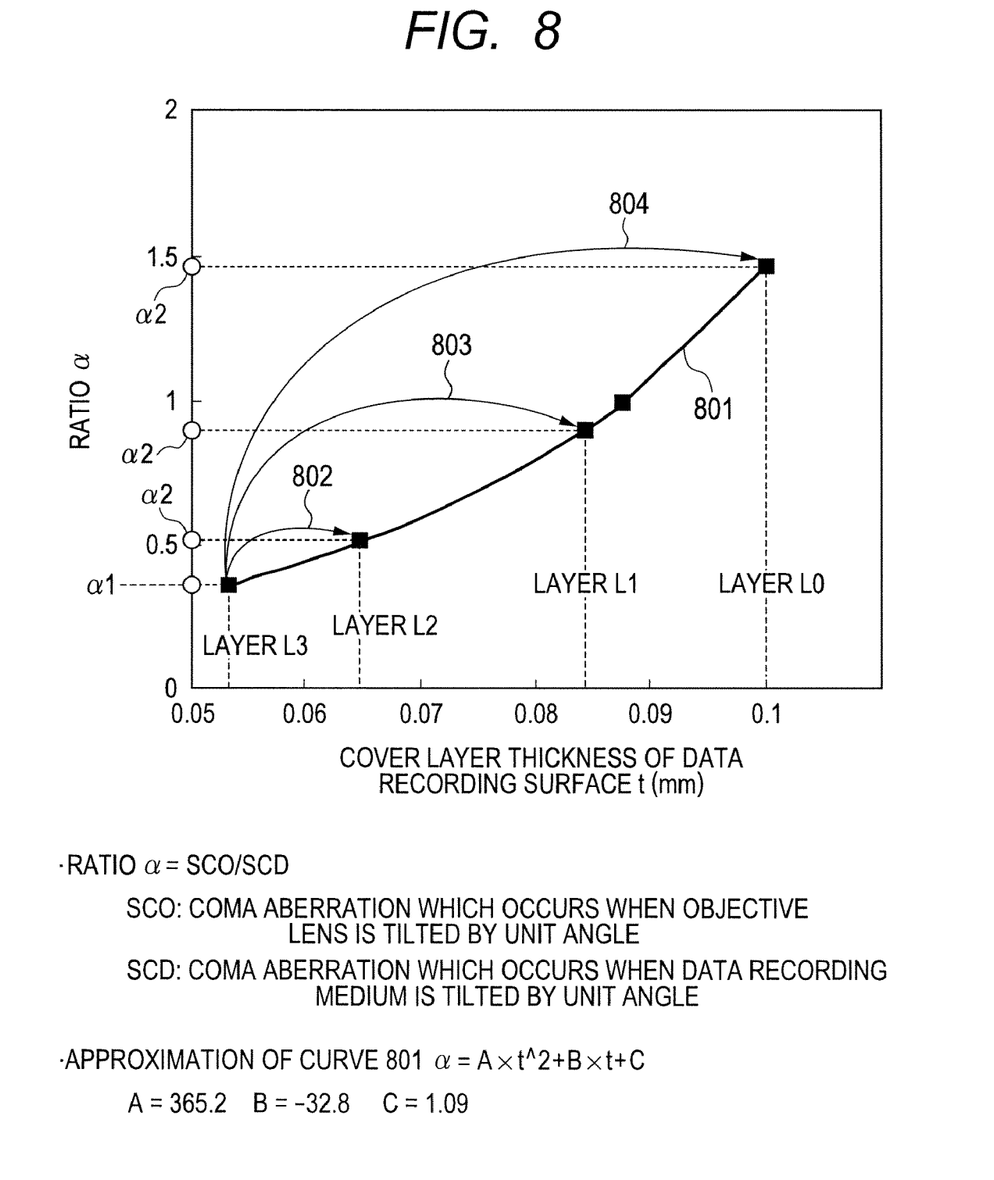
FIG. 8 is a graph showing the relation between the cover layer thickness t of the data recording surface and ratio α.

Based on the calculation result shown in FIG. 7, FIG. 8 shows the relation between the cover layer thickness t of the data recording surface (horizontal axis) and the ratio α (SCO/SCD) (vertical axis) in which as explained earlier with reference to FIG. 1, SCD denotes coma aberration which occurs when the data recording medium 112 is tilted by unit angle and SCO denotes coma aberration which occurs when the BD objective lens 111 is tilted by unit angle. In the graph, 801 represents the α-versus-t characteristic curve and in this embodiment, the characteristic curve 801 can be approximated as a quadratic curve expressed by Equation 1 given below:

$$\alpha = A \times t^2 + B \times t + C \quad \text{(Equation 1)}$$

where A=365.2, B=−32.8, and C=1.09. For the layer L0, α>1 and for the layers L1, L2, and L3, α<1, and when t=0.0875 mm, α=1. Here, α is previously stored in the pickup data storage unit 121 in the form of Equation 1.

The pickup data storage unit 121 is connected with the pickup controller 122 and the pickup controller 122 can call data on the ratio α from the pickup data storage unit 121 for a tilt adjustment and a tilt correction as will be explained later referring to FIG. 9A to FIG. 11.

Where α1 denotes the ratio α for the layer L3 corresponding to the smallest cover layer thickness t of the data recording surface and α2 denotes the ratio α for the target data recording surface (any of the layers L2, L1 and L0), since the curve 801 is known, coefficient K (=α2/α1) which corresponds to 802 for the layer L2, 803 for the layer L1, or 804 for the layer L0 can be calculated.

Figure 9A:
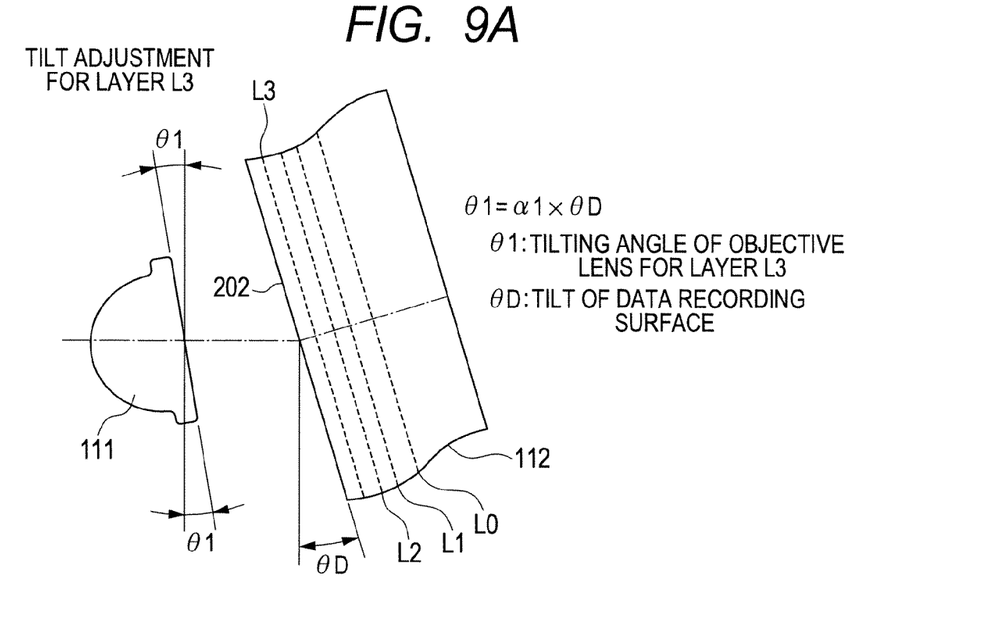
FIG. 9A illustrates a tilt adjustment of the BD objective lens with respect to layer L3.

FIG. 9A shows a tilt adjustment of the BD objective lens 111 which is made with respect to the layer L3 corresponding to the smallest cover layer thickness in the initial adjustment process of the optical data recording/reproduction apparatus for multi-layer BDs according to this embodiment. Where θ1 denotes the tilting angle of the BD objective lens 111 and θD denotes the tilt of the data recording surface, the tilting angle θ1 is expressed in relation to α1 (mentioned above) by Equation 2 given below:

$$\theta 1 = \alpha 1 \times \theta D \quad \text{(Equation 2)}$$

Figure 9B:
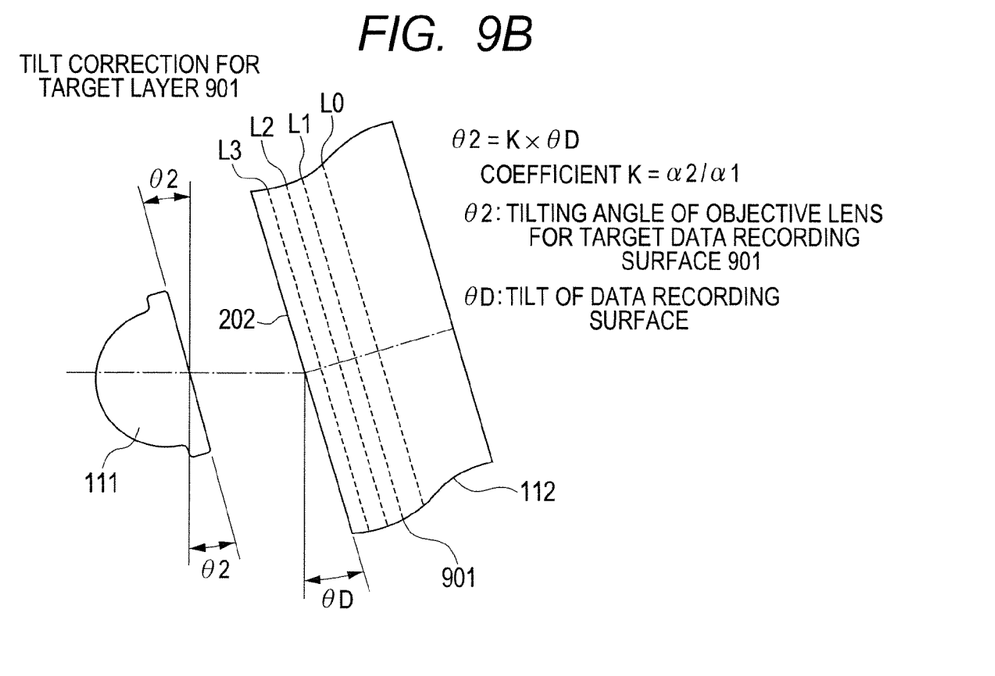
FIG. 9B illustrates a tilt correction of the BD objective lens with respect to a target layer.

FIG. 9B shows a tilt correction of the BD objective lens 111 which is made for the target layer 901 during actual operation of the optical data recording/reproduction apparatus for multi-layer BDs according to this embodiment. The tilting angle θ2 is estimated in relation to the coefficient K (=α2/α1) by Equation 3 given below, where θ2 denotes the tilting angle of the BD objective lens 111 for the target layer 901 and θD denotes the tilt of the data recording surface:

$$\theta 2 = K \times \theta D, \text{ where } K = \alpha 2/\alpha 1 \quad \text{(Equation 3)}$$

This tilt correction is made, for example, when the revolution speed of the data recording medium 112 has changed or when the ambient temperature for the optical pickup 116 has changed. Obviously this correction may be made in a normal occasion.

Figure 10:
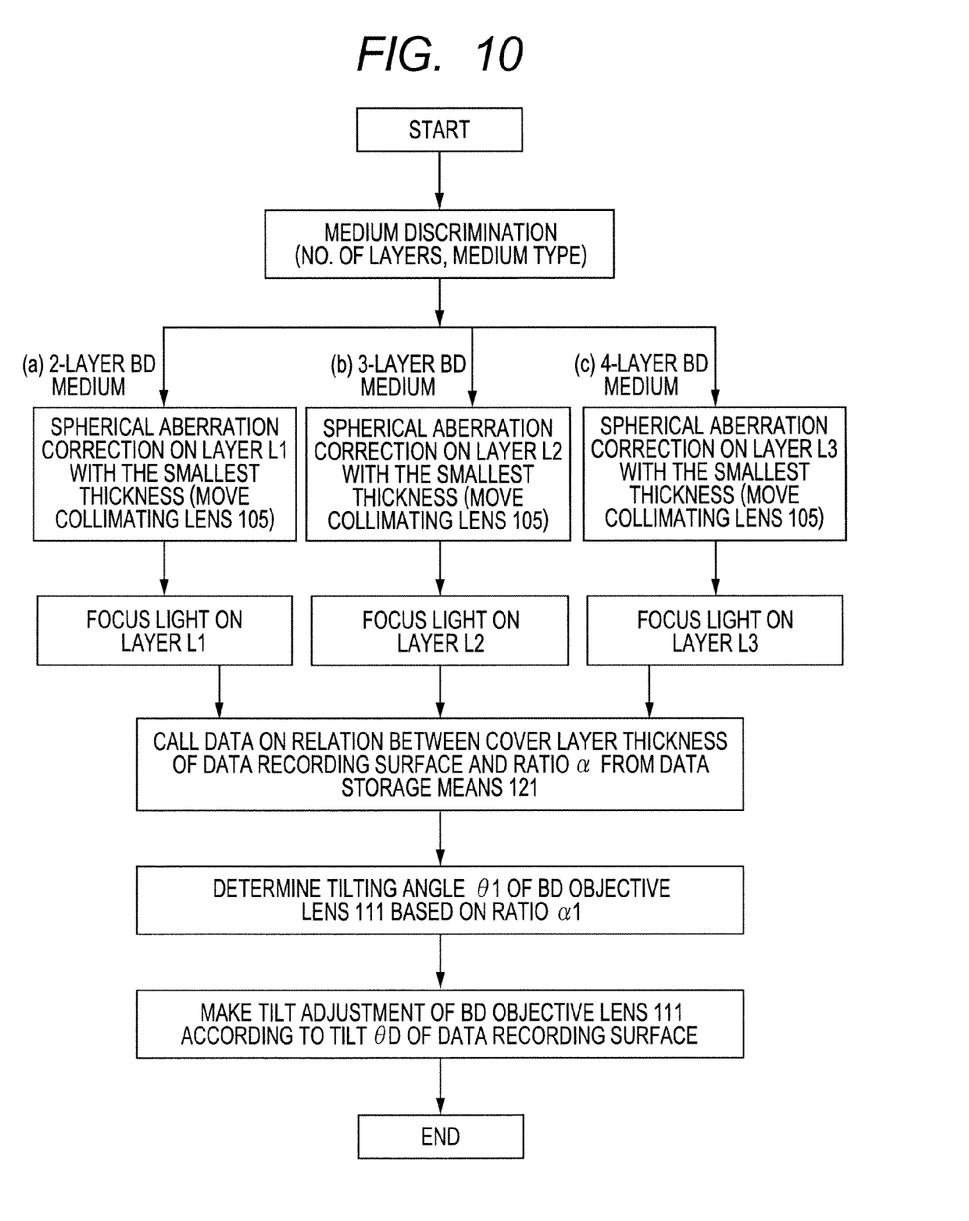
FIG. 10 is a flowchart showing the sequence of a tilt adjustment of the BD objective lens.

FIG. 10 is a flowchart showing the sequence of a tilt adjustment of the BD objective lens in this embodiment. In the flowchart, (a), (b), and (c) represent the use of a dual-layer BD medium, a three-layer BD medium, and a four-layer BD medium, respectively and a tilt adjustment is made by following the various steps described in the rectangular blocks. This adjustment is performed during the initial adjustment process for the optical data recording/reproduction apparatus.

Figure 11:
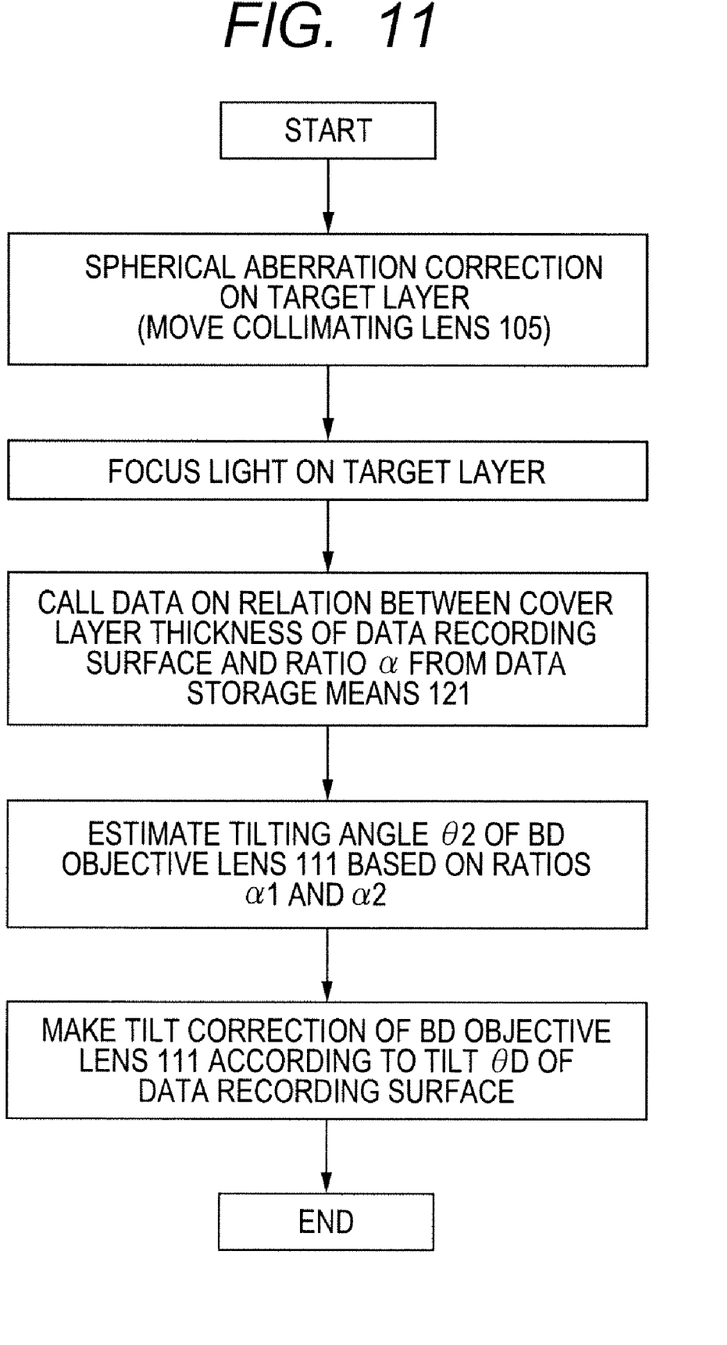
FIG. 11 is a flowchart showing the sequence of a tilt correction of the BD objective lens.

FIG. 11 is a flowchart showing the sequence of a tilt correction of the BD objective lens in this embodiment, in which a tilt correction is made by following the various steps described in the rectangular blocks. This correction is performed during actual operation of the optical data recording/reproduction apparatus after the initial adjustment process thereof. Although the abovementioned tilt adjustment and tilt correction are based on the assumption that the BD objective lens is generally tilted with respect to the radial direction of the data recording medium, alternatively the lens may be tilted with respect to the tangential direction of the data recording medium.

The preferred embodiment of the present invention has been so far explained. Next, the advantages of the present invention are described. According to the invention, a tilt adjustment is made with respect to the data recording surface corresponding to the smallest cover layer thickness where three-dimensional coma aberration can be the largest when the objective lens is tilted. Furthermore, the tilt correction of the objective lens with respect to the target data recording surface can be estimated. This brings about the following advantageous effects:

(1) A tilt adjustment of the objective lens has only to be made with respect to one data recording surface and it is unnecessary to make a tilt adjustment of the objective lens with respect to all data recording surfaces, so the initial adjustment time for the optical data recording/reproduction apparatus can be shortened.
(2) When the objective lens is tilted, it is least likely to collide with the data recording medium.
(3) A tilt correction of the objective lens with respect to the target data recording surface can be made quickly.
(4) The tilting angle of the objective lens with respect to the data recording medium can be minimized so that the burden on the actuator as a tilting driving unit is reduced.
(5) The tilting driving voltage of the actuator can be minimized, preventing the ambient temperature for the objective lens from rising due to coil heat.

Therefore, a coma aberration correction can be made properly with respect to the data recording surface of a multi-layer BD and it is possible to realize an optical data recording/reproduction apparatus which assures the quality of a light spot on the data recording surface and provides high recording and reproduction performances.

The present invention has been described in its preferred form but the invention is not limited in its application to the abovementioned. For example, the invention can be applied to data recording media having more data recording surfaces (layers) such as six-layer BD media and eight-layer BD media. Furthermore, the invention may also be applied to an optical pickup which has a DVD/CD optical system as well as a BD optical system and copes with BD, DVD, and CD media (an optical pickup which has two objective lenses, namely an objective lens for BDs only and a DVD/CD compatible objective lens, or which has one BD/DVD/CD compatible objective lens) and may also be applied to an optical data recording/reproduction apparatus with such optical pickup. In addition, the design standard cover layer thickness is not limited to 0.0875 mm and it may be a different value. The spherical aberration correction driving unit 106 is not limited to a collimating lens and it may be a beam expander or liquid crystal lens or wavefront correction mirror.

What is claimed is:

1. An optical data recording/reproduction apparatus comprising:
   a laser light source;
   an objective lens for focusing a light beam emitted from the laser light source on a data recording surface of a data recording medium;
   a spherical aberration correcting unit located in a light path between the laser light source and the objective lens;
   an optical pickup with a driving unit for tilting the objective lens; and
   a controller for the optical pickup, wherein:
   where SCD denotes coma aberration which occurs at a focused light spot on the data recording surface when the data recording medium is tilted by unit angle and SCO denotes coma aberration which occurs at a focused light spot on the data recording surface when the objective lens is tilted by unit angle, a relation between a cover layer thickness of the data recording surface and ratio α of SCO to SCD (SCO/SCD) is previously calculated and stored in a storage unit;
   where alpha 1 denotes the ratio alpha for a data recording surface corresponding to a smallest cover layer thickness, tilting angle θ1 of the objective lens is determined based on the α1 and a tilt adjustment of the objective lens is made;
   and where α2 denotes the ratio α for a target data recording surface, tilting angle θ2 of the objective lens is estimated based on a ratio of α2 to α1 and a tilt correction of the objective lens is made.

2. The optical data recording/reproduction apparatus according to claim 1, wherein the data recording medium is a multi-layer data recording medium having a plurality of data recording surfaces.

3. The optical data recording/reproduction apparatus according to claim 1, wherein the tilting angle θ1 of the objective lens is determined during an initial adjustment of the optical data recording/reproduction apparatus.

4. The optical data recording/reproduction apparatus according to claim 1, wherein the controller is connected with the storage unit and retrieves data on the ratio α from the storage unit.

5. The optical data recording/reproduction apparatus according to claim 1, wherein the ratio α is stored in the storage unit as data in relation to the cover layer thickness.

6. The optical data recording/reproduction apparatus according to claim 1, wherein:
   the spherical aberration correcting unit is a mechanism to move a collimating lens in an optical axis direction by a motor, and
   the ratio α is stored in the storage unit as position data of the collimating lens or data on a relation with a motor drive pulse number.

* * * * *